(12) United States Patent
Ohno et al.

(10) Patent No.: US 12,725,871 B2
(45) Date of Patent: Sep. 1, 2026

(54) PROTECTIVE CASE AND DRIVE UNIT

(71) Applicant: EXEDY Corporation, Neyagawa (JP)

(72) Inventors: Taichi Ohno, Neyagawa (JP); Hitoshi Katsura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 769 days.

(21) Appl. No.: 18/300,352

(22) Filed: Apr. 13, 2023

(65) Prior Publication Data

US 2023/0369704 A1 Nov. 16, 2023

(30) Foreign Application Priority Data

May 13, 2022 (JP) ................................ 2022-079595

(51) Int. Cl.

| | |
|---|---|
| ***H01M 50/00*** | (2021.01) |
| ***H01M 50/24*** | (2021.01) |
| ***H01M 50/249*** | (2021.01) |
| *B60L 50/60* | (2019.01) |

(52) U.S. Cl.

CPC ......... *H01M 50/249* (2021.01); *H01M 50/24* (2021.01); *B60L 50/60* (2019.02); *B60L 2200/42* (2013.01); *H01M 2220/20* (2013.01)

(58) Field of Classification Search

CPC ............... H01M 50/249; H01M 50/24; H01M 2220/20; B60L 50/60; B60L 2200/42

USPC .......................................................... 296/209

See application file for complete search history.

(56) References Cited

U.S. PATENT DOCUMENTS

| | | | | |
|---|---|---|---|---|
| 3,930,552 A * | 1/1976 | Kunkle | ............... | H01M 50/204 180/68.5 |
| 4,779,692 A * | 10/1988 | Hagarty | .................. | B60R 16/04 180/68.5 |
| 4,847,170 A | 7/1989 | Martin | | |
| 5,360,307 A * | 11/1994 | Schemm | .................. | B62B 3/10 180/68.5 |
| 5,437,939 A * | 8/1995 | Beckley | ............. | B66F 9/07531 180/68.5 |
| 8,302,716 B2 * | 11/2012 | Yoda | ....................... | B60R 16/04 180/68.5 |

(Continued)

FOREIGN PATENT DOCUMENTS

| | | |
|---|---|---|
| DE | 10 2016 224 965 A1 | 6/2017 |
| JP | H02-167981 A | 6/1990 |

(Continued)

OTHER PUBLICATIONS

Office Action issued in Japanese Application No. 2022-079595, First Notice of Rejection, Issued on Apr. 7, 2026, 4 Pages.

*Primary Examiner* — Steven O Douglas

(74) *Attorney, Agent, or Firm* — United IP Counselors, LLC

(57) ABSTRACT

A protective case into which dust or rainwater can be inhibited from intruding includes a housing and a door part. The housing includes an opening. The door part includes a rotational shaft portion and a door body. The rotational shaft portion is disposed outside the housing so as to overlap with the housing. The door body extends from the rotational shaft portion so as to cover the opening. The door part is attached to the housing so as to be openable and closable about the rotational shaft portion.

10 Claims, 9 Drawing Sheets

(56) References Cited

U.S. PATENT DOCUMENTS

| | | | | |
|---|---|---|---|---|
| 8,714,291 | B2 * | 5/2014 | Riach | B60R 16/04 180/68.5 |
| 2012/0067914 | A1 * | 3/2012 | Sadler | H01M 50/24 220/810 |
| 2012/0269606 | A1 | 10/2012 | Newell | |
| 2017/0183054 | A1 | 6/2017 | Ina | |

FOREIGN PATENT DOCUMENTS

| | | | |
|---|---|---|---|
| JP | 2007-131147 | A | 5/2007 |
| JP | 2012-122319 | A | 6/2012 |
| JP | 2014512307 | A | 5/2014 |
| JP | 2019-011187 | A | 1/2019 |

* cited by examiner

FIG. 7

PROTECTIVE CASE AND DRIVE UNIT

CROSS-REFERENCE TO RELATED APPLICATIONS

This application claims priority to, and the benefit of, Japanese Patent Application No. 2022-079595, filed May 13, 2022. The contents of that application are incorporated by reference herein in their entirety.

TECHNICAL FIELD

The present invention relates to a protective case and a drive unit.

BACKGROUND

It has been proposed to install a drive unit in a mobile object such as a pallet truck so as to assist movement of the mobile object (e.g., Japanese translation of PCT International Application Publication No. 2014-512307). Electronic components used for the drive unit, such as a battery, an electronic board, and so forth, are accommodated inside a protective case.

The protective case includes an openable and closable door part such that the battery can be taken out from the protective case. In general, the door part is attached to a housing through a hinge. However, when the protective case is configured as described above, chances are that dust, rainwater, or so forth intrude into the housing through a gap between the door part and the housing.

It is an object of the present invention to provide a protective case into which dust or rainwater can be inhibited from intruding.

BRIEF SUMMARY

A protective case according to a first aspect includes a housing and a door part. The housing includes an opening. The door part includes a rotational shaft portion and a door body. The rotational shaft portion is disposed outside the housing so as to overlap with the housing. The door body extends from the rotational shaft portion so as to cover the opening. The door part is attached to the housing so as to be openable and closable about the rotational shaft portion.

According to the configuration, the rotational shaft portion of the door part is disposed outside the housing and overlaps with the housing. Thus, the door part and the housing overlap with each other, whereby dust or rainwater can be inhibited from intruding into the protective case.

A protective case according to a second aspect relates to the protective case according to the first aspect and further includes a first labyrinth portion. The first labyrinth portion extends from an outer lateral surface of the housing on an opposite side of the door body with reference to the rotational shaft portion.

A protective case according to a third aspect relates to the protective case according to the second aspect and further includes a second labyrinth portion. The second labyrinth portion extends from the first labyrinth portion so as to interpose and hold the rotational shaft portion together with the housing therebetween.

A protective case according to a fourth aspect relates to the protective case according to the third aspect and is configured such that the second labyrinth portion is shorter in dimension from the first labyrinth portion than a portion at which the housing overlaps with the door part.

A protective case according to a fifth aspect relates to the protective case according to any of the first to fourth aspects and is configured such that the housing includes a bottom plate portion supporting the rotational shaft portion. The bottom plate portion includes a discharge channel extending to an end edge of the bottom plate portion from a portion at which the housing overlaps with the door part.

A protective case according to a sixth aspect relates to the protective case according to any of the first to fifth aspects and is configured such that the housing includes a bottom plate portion, a top plate portion, and a lateral plate portion. The top plate portion is disposed above the bottom plate portion. The lateral plate portion extends from the bottom plate portion to the top plate portion and includes the opening. The door body is disposed such that an inner lateral surface thereof is opposed to at least one of a lateral surface of the top plate portion and a lateral surface of the bottom plate portion.

A protective case according to a seventh aspect relates to the protective case according to the sixth aspect and is configured such that the top plate portion includes a top plate body and a circumferential edge wall. The circumferential edge wall extends from an outer peripheral edge of the top plate body toward the bottom plate portion. The door body is disposed such that the inner lateral surface thereof is opposed to an outer lateral surface of the circumferential edge wall.

A protective case according to an eighth aspect relates to the protective case according to the seventh aspect and is configured such that the top plate portion includes a third labyrinth portion extending from an outer lateral surface of the circumferential edge wall. The door body is disposed such that a top end surface thereof is opposed to the third labyrinth portion.

A protective case according to a ninth aspect relates to the protective case according to any of the first to eighth aspects and is configured such that the housing includes a bottom plate portion, a top plate portion, and a lateral plate portion. The top plate portion is disposed above the bottom plate portion. The lateral plate portion extends from the bottom plate portion to the top plate portion. The lateral plate portion includes the opening. The rotational shaft portion include a first end and a second end. The first end is inserted into a through hole provided in the bottom plate portion. The second end is inserted into a recess provided on the top plate portion.

A drive unit according to a tenth aspect includes the protective case recited in any of the first to ninth aspects, a battery disposed inside the housing, and an electric motor configured to be driven by electric power supplied thereto from the battery.

Overall, according to the present invention, it is possible to realize a protective case into which dust or rainwater can be inhibited from intruding.

BRIEF DESCRIPTION OF THE DRAWINGS

FIG. 7 is a closeup cross-sectional view of the protective case seen from a lateral side.

DETAILED DESCRIPTION

Figure 1:
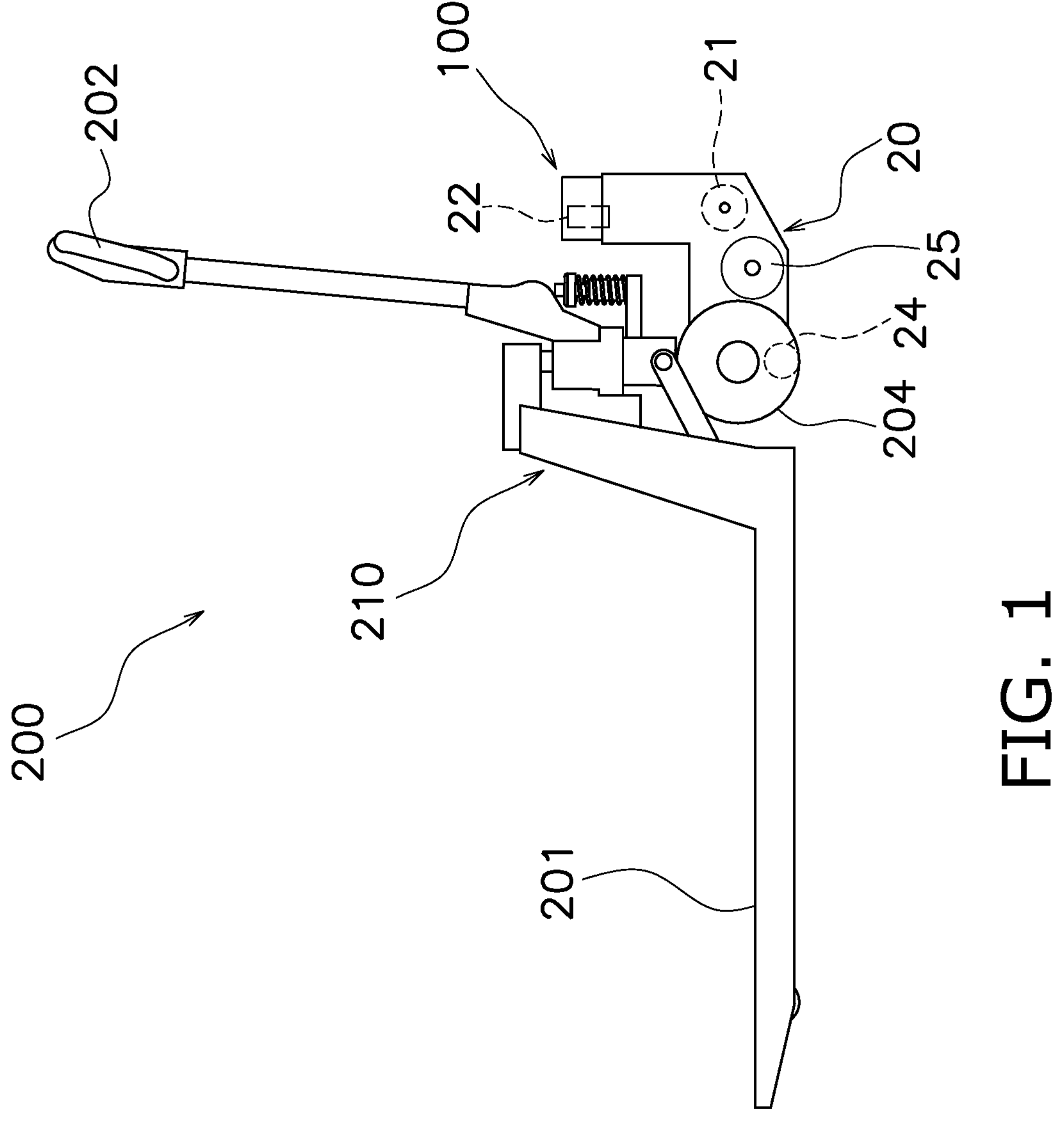
FIG. 1 is a side view of a pallet truck.

A protective case and a drive unit according to the present embodiment will be hereinafter explained with reference to drawings. It should be noted that FIG. 1 is a side view of a pallet truck embedded with a drive unit according to the present embodiment. It should be noted that the drive unit can be also embedded in a mobile object other than the pallet truck (e.g., a hand lift truck, a hand truck, or a wheelchair) or so forth. In addition, the protective case is also applicable to an electric product other than the drive unit.

As shown in FIG. 1, a pallet truck 200 includes a pallet truck body 210 and a drive unit 20. The pallet truck body 210 includes a loading platform (a pair of fork arms) 201, an operating handle 202, and a plurality of vehicle wheels 204. It should be noted that each vehicle wheel 204 is a non-drive wheel. The drive unit 20 is attached to the pallet truck body 210.

<Drive Unit>

The drive unit 20 includes an electric motor 21, a battery 22, and a protective case 100. Additionally, the drive unit 20 includes a drive wheel 24, a reducer 25, and so forth.

When the pallet truck 200 travels under human drive force provided by a user, the electric motor 21 outputs an assist force for assisting traveling of the pallet truck 200. The electric motor 21 rotates and drives the drive wheel 24.

The battery 22 is configured to supply electric power to the electric motor 21 and so forth. The electric motor 21 is configured to be driven by the electric power supplied thereto from the battery 22. The battery 22 is accommodated inside a housing 3 (to be described) so as to be capable of being removed from the housing 3.

The reducer 25 reduces the speed of rotation of the electric motor 21 and transmits the rotation reduced in speed to the drive wheel 24. The reducer 25 is composed of, for instance, a plurality of gears and so forth.

[Protective Case]

Figure 2:
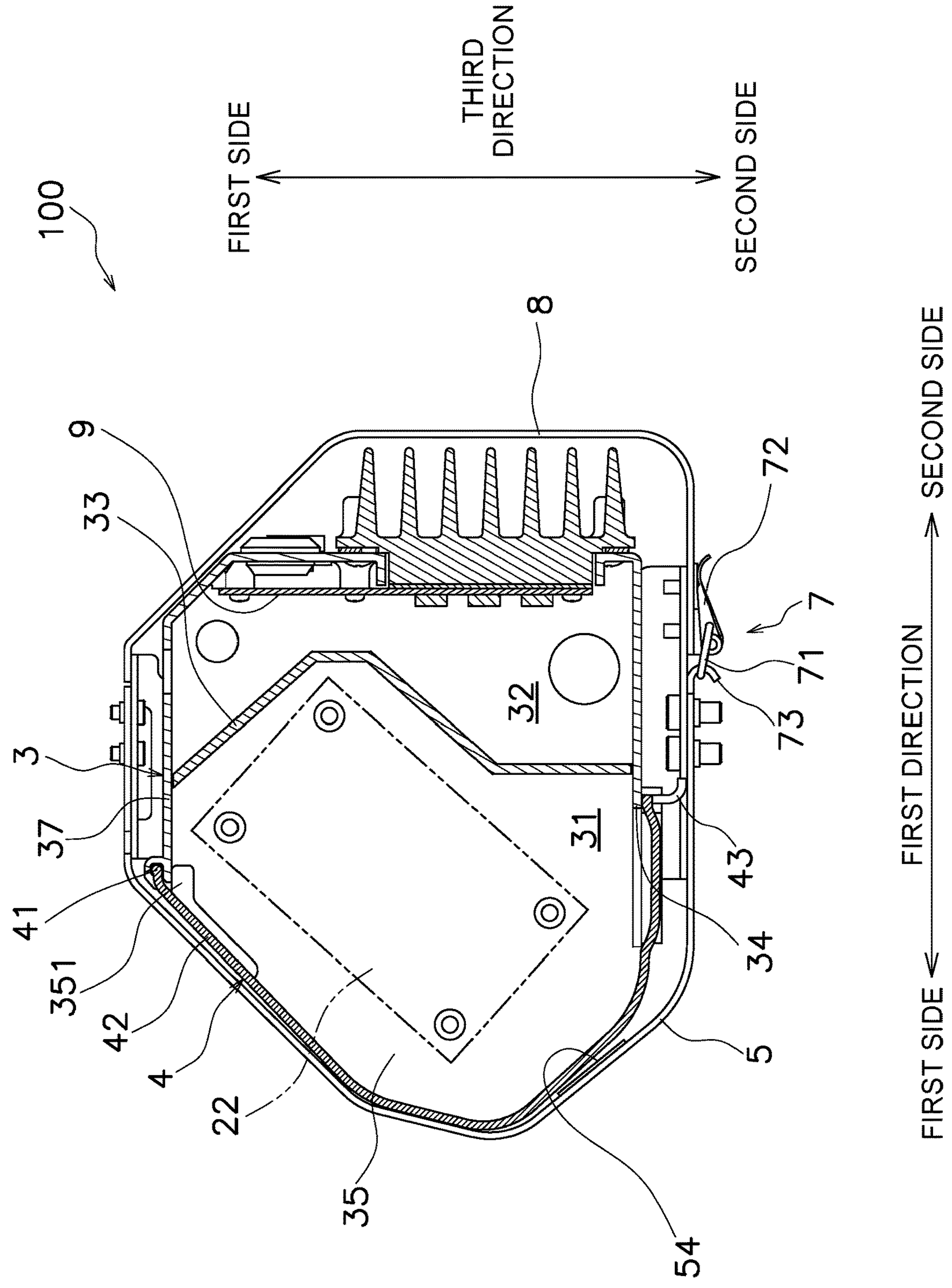
FIG. 2 is a cross-sectional view of a protective case seen from above.
Figure 3:
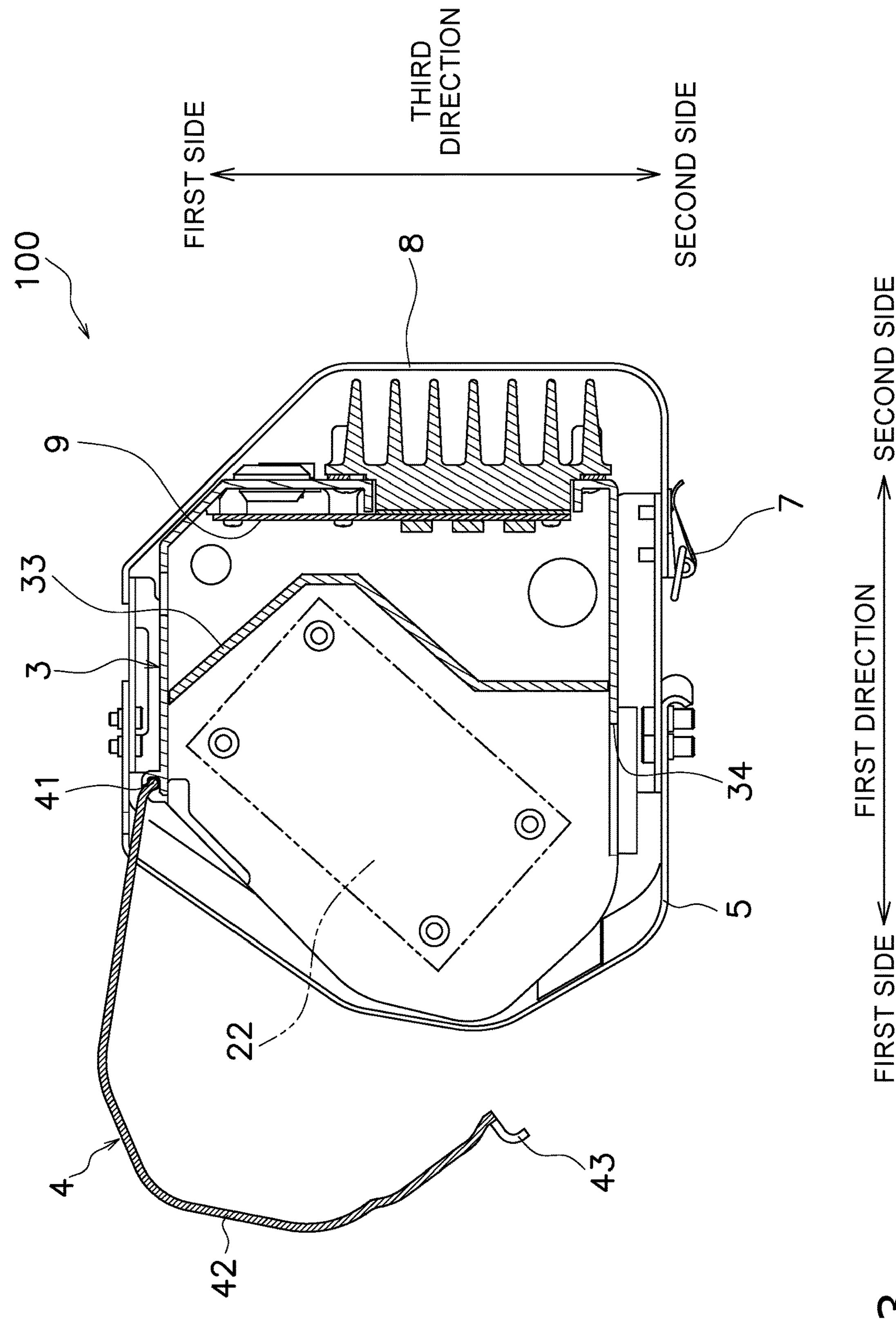
FIG. 3 is a cross-sectional view of the protective case seen from above.

FIGS. 2 and 3 are cross-sectional views of the protective case 100 seen from above. It should be noted that FIG. 2 shows the protective case 100 that a door part 4 is in a closed state, whereas FIG. 3 shows the protective case 100 that the door part 4 is in an opened state. As shown in FIGS. 2 and 3, the protective case 100 is configured to protect the battery 22 and so forth accommodated in the interior thereof. The protective case 100 includes the housing 3, the door part 4, and a labyrinth structure 6. In addition, the protective case 100 includes a first protective member 5, a lock mechanism 7, and a second protective member 8.

[Housing]

The housing 3 is configured to accommodate a variety of components. When described in detail, the housing 3 accommodates the battery 22 in the interior thereof. In addition, the housing 3 accommodates an electronic board 9. The electronic board 9 is electrically connected to the battery 22. A plurality of semiconductor elements and so forth are soldered to the electronic board 9.

The housing 3 includes a first space 31 for accommodating the battery 22 and a second space 32 for accommodating the electronic board 9. In other words, the housing 3 is divided into two spaces through a partition 33. It should be noted that the housing 3 is made of, for instance, synthetic resin such as ABS (Acrylonitrile Butadiene Styrene) resin, ASA (Acrylonitrile Styrene Acrylate) resin, or PES (Polyethersulfone) resin, or so forth.

The housing 3 includes an opening 34. The housing 3 ensures airtightness except for the opening 34 so as to prevent dust, rainwater, and so forth from entering the interior thereof from above and lateral sides.

The opening 34 is opened in a first direction. It should be noted that the right-and-left direction in FIGS. 2 and 3 corresponds to the first direction. Therefore, in the present embodiment, the opening 34 is opened in the right-and-left direction in FIGS. 2 and 3. The opening 34 is disposed on a first side of the housing 3 in the first direction. In other words, the housing 3 is opened to the first side in the first direction.

It should be noted that in the following explanation, the first side in the first direction refers to a side on which the housing 3 is provided with the opening 34, whereas a second side in the first direction refers to the opposite side of the first side. It should be noted that in the present embodiment, the left side in FIGS. 2 and 3 corresponds to the first side in the first direction, whereas the right side in FIGS. 2 and 3 corresponds to the second side in the first direction. The battery 22 is taken out from the interior of the housing 3 through the opening 34.

The housing 3 includes a bottom plate portion 35, a top plate portion 36 (see FIG. 5), and a lateral plate portion 37. The bottom plate portion 35 includes a discharge groove 351 (exemplary discharge channel). The top plate portion 36 is disposed directly above the bottom plate portion 35. The lateral plate portion 37 extends upward from the bottom plate portion 35. When described in detail, the lateral plate portion 37 extends from the bottom plate portion 35 to the top plate portion 36. The opening 34 is provided in the lateral plate portion 37. The top plate portion 36 is attached to the lateral plate portion 37, whereby the upper surface of the lateral plate portion 37 is closed.

[Door Part]

The door part 4 is attached to the housing 3 such that the opening 34 is covered with the door part 4, while being openable and closable. It should be noted that FIG. 2 shows the closed state of the door part 4, whereas FIG. 3 shows the opened state of the door part 4. The door part 4 includes a rotational shaft portion 41 and a door body 42 and is rotated about the rotational shaft portion 41 so as to be switched between the closed state and the opened state. The closed state of the door part 4 is kept in a normal condition exemplified by traveling of the pallet truck 200. The opened state of the door part 4 is made in removal or replacement of the battery 22.

Figure 4:
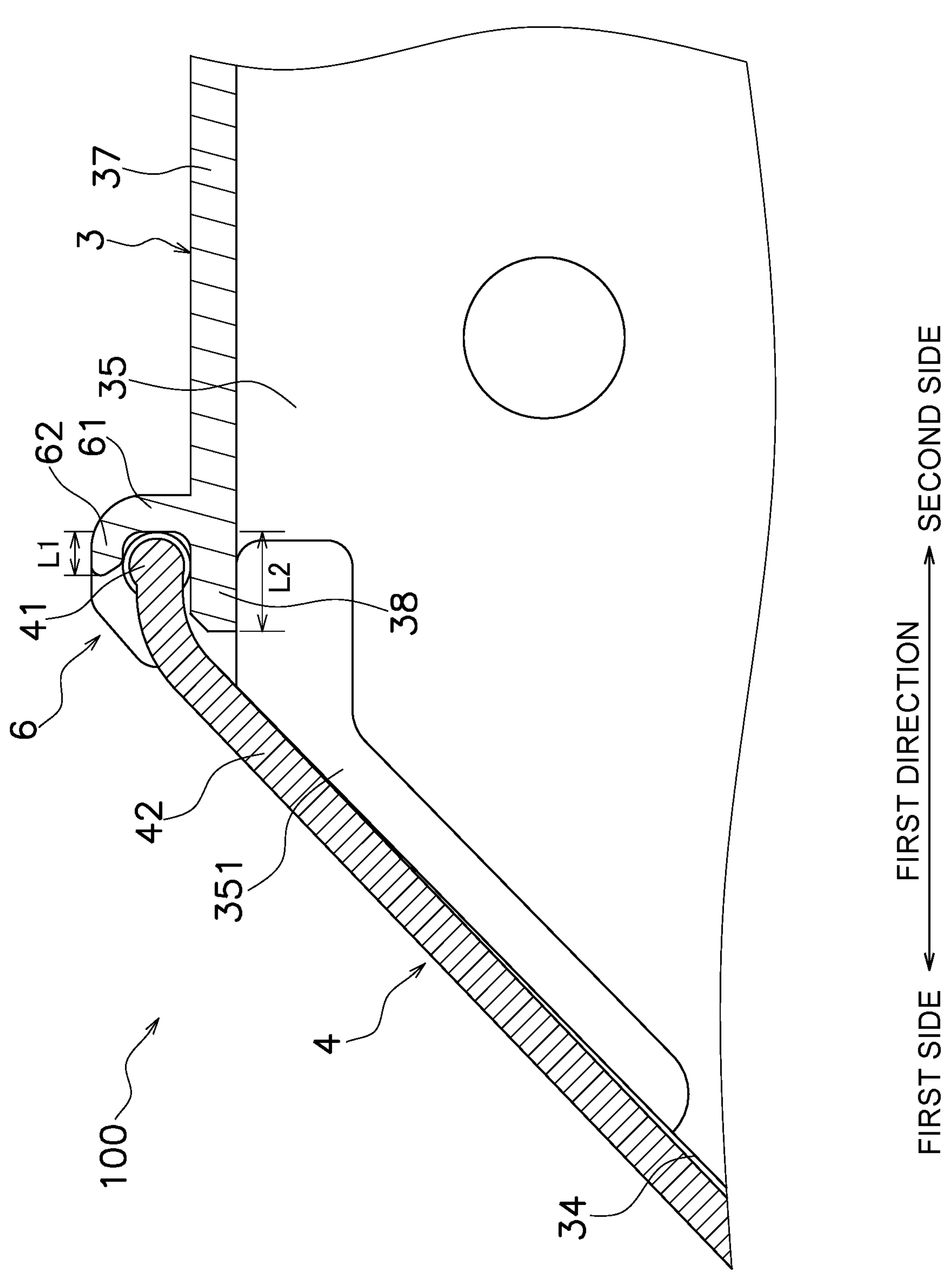
FIG. 4 is a closeup cross-sectional view of the protective case seen from above.

FIG. 4 is a closeup view of FIG. 2 focusing on the rotational shaft portion 41. It should be noted that FIG. 4 only shows the housing 3 and the door part 4 for easy understanding of the drawing. As shown in FIG. 4, the rotational shaft portion 41 is disposed to overlap with the housing 3 on the outside of the housing 3. The rotational shaft portion 41 has a substantially columnar shape.

Figure 5:
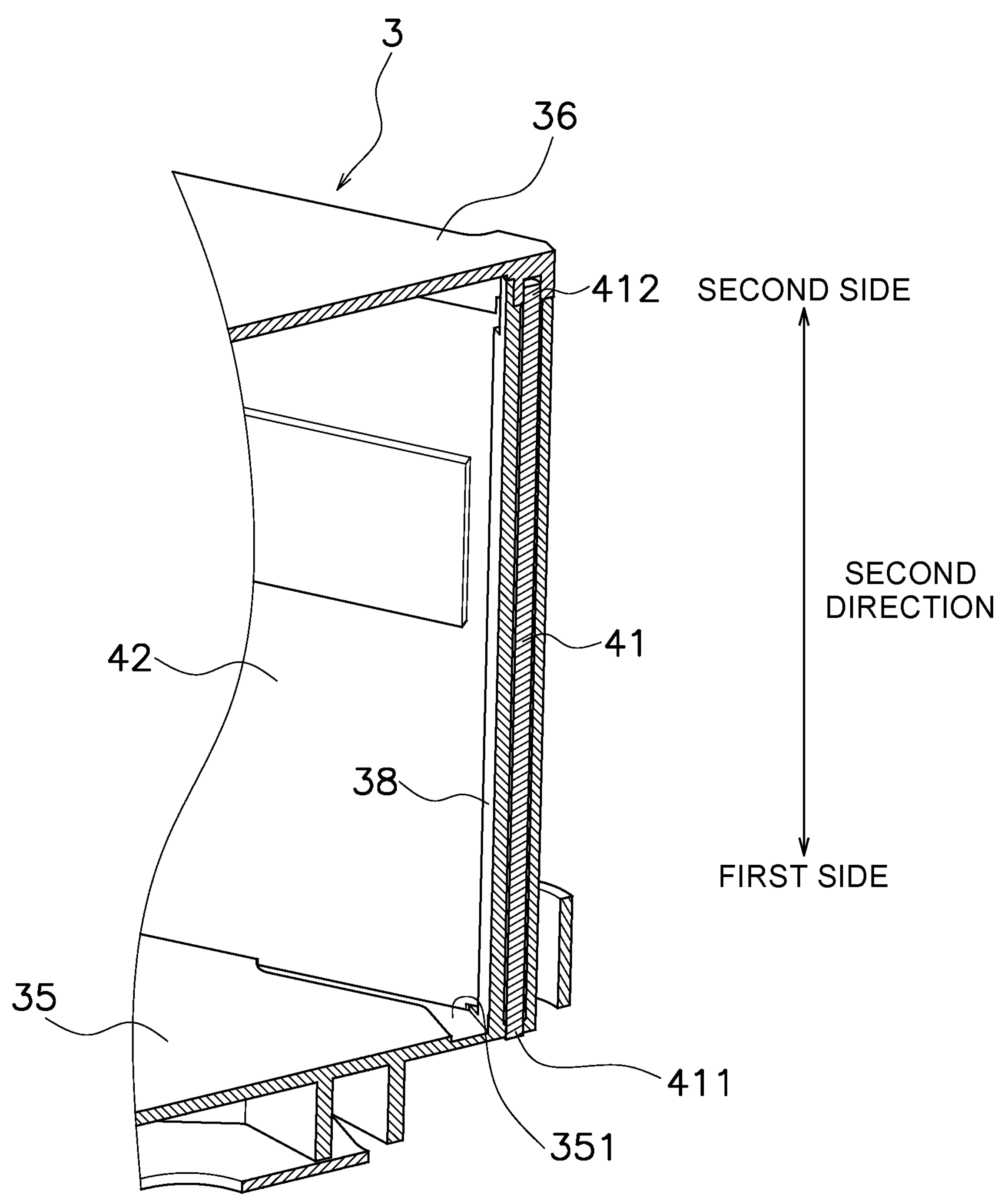
FIG. 5 is a cross-sectional perspective view of the protective case.

FIG. 5 is a closeup cross-sectional view focusing on the rotational shaft portion 41. As shown in FIG. 5, the rotational shaft portion 41 extends along a second direction. It should be noted that in the present embodiment, the rotational shaft portion 41 extends along an up-and-down direction. The rotational shaft portion 41 includes a first end 411 and a second end 412 along the second direction. It should be noted that in the present embodiment, the first end 411 is the lower end of the rotational shaft portion 41, whereas the second end 412 is the upper end of the rotational shaft portion 41.

The first end 411 of the rotational shaft portion 41 is rotatably supported by the bottom plate portion 35 of the housing 3. When described in detail, the first end 411 is inserted into a through hole provided in the bottom plate portion 35. When described in more detail, the first end 411 is inserted into a through hole provided in a support portion 352 (see FIG. 6) of the bottom plate portion 35. The second end 412 of the rotational shaft portion 41 is rotatably supported by the top plate portion 36 of the housing 3. When described in detail, the second end 412 is inserted into a recess provided on the top plate portion 36. It should be noted that the recess is provided on the top plate portion 36 without penetrating therethrough.

As shown in FIG. 2, the door body 42 extends from the rotational shaft portion 41 so as to cover the opening 34. The door part 4 extends in a third direction. As seen from above, the door body 42 bulges to the first side in the first direction. The rotational shaft portion 41 of the door part 4 is disposed on a first side in the third direction. The door part 4 includes a tab 43 on a second side of the door body 42 in the third direction. A user is enabled to open and close the door part 4 by pinching the tab 43. It should be noted that the third direction means a direction intersecting with the first direction. In the present embodiment, the third direction is orthogonal to the first direction. The first side in the third direction refers to a side that the rotational shaft portion 41 of the door part 4 is disposed, whereas the second side in the third direction refers to the opposite side of the first side in the third direction.

[Labyrinth Structure]

As shown in FIG. 4, the labyrinth structure 6 is configured to inhibit dust, rainwater, and so forth as much as possible from intruding into the housing 3 through a gap between the rotational shaft portion 41 and the housing 3. The labyrinth structure 6 includes a first labyrinth portion 61 and a second labyrinth portion 62.

The first labyrinth portion 61 is disposed on the opposite side of the door body 42 with reference to the rotational shaft portion 41. When described in detail, in the closed state of the door part 4, the first labyrinth portion 61 is disposed on the opposite side of a boundary between the door body 42 and the rotational shaft portion 41 with reference to the rotational shaft portion 41. In the present embodiment, the first labyrinth portion 61 is disposed on the second side of the rotational shaft portion 41 in the first direction.

The first labyrinth portion 61 extends from the outer lateral surface of the housing 3. When described in detail, the first labyrinth portion 61 extends from the lateral plate portion 37 of the housing 3. The first labyrinth portion 61 extends in a direction remote from the lateral plate portion 37.

Figure 6:
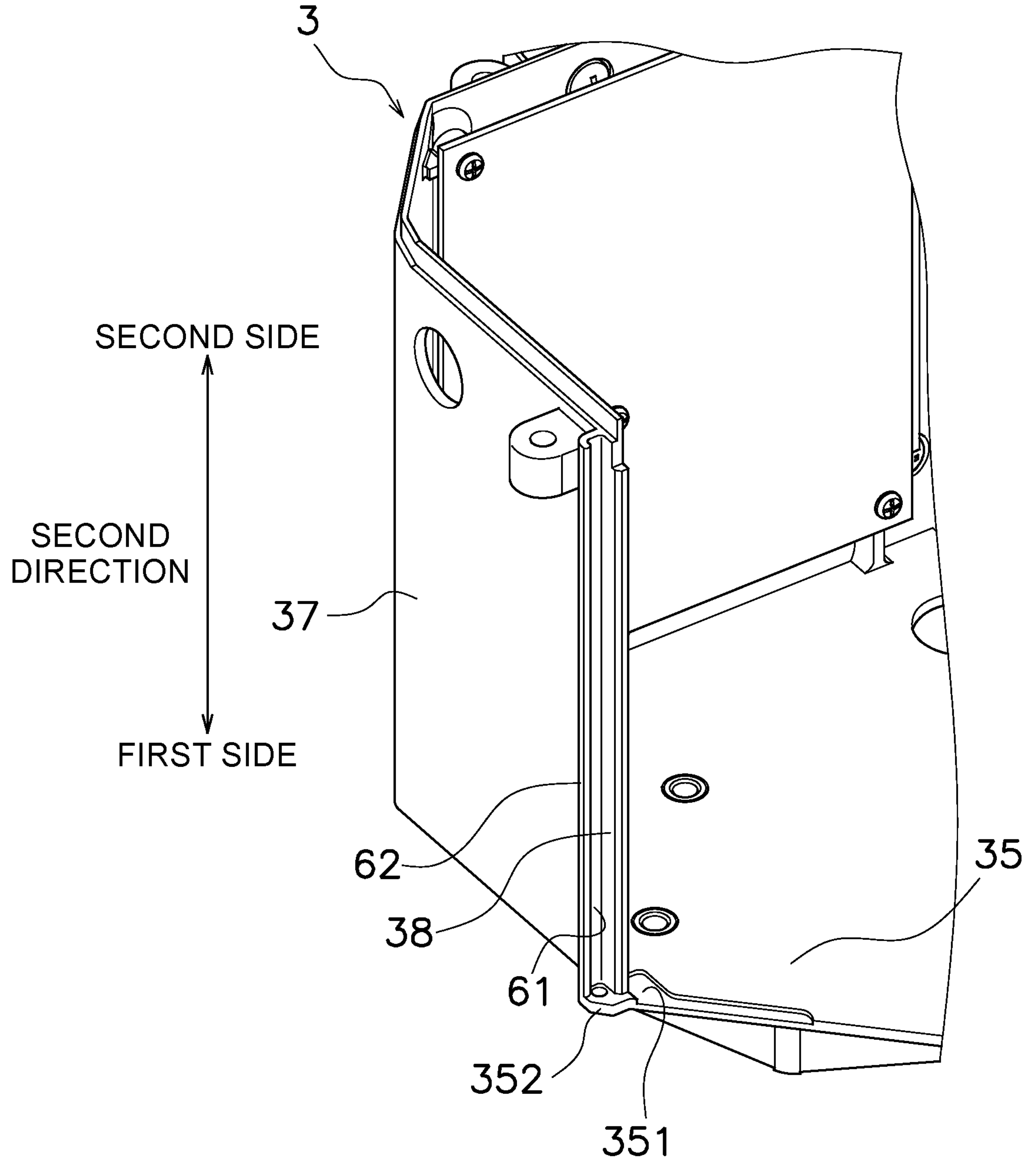
FIG. 6 is a perspective view of a housing from which a top plate portion is removed.

FIG. 6 is a perspective view of the housing 3 from which the top plate portion 36 is detached. As shown in FIG. 6, the first labyrinth portion 61 extends in the second direction as well along the rotational shaft portion 41. The first labyrinth portion 61 extends to the bottom plate portion 35 of the housing 3. When described in detail, the bottom plate portion 35 includes the support portion 352 protruding outward from the lateral plate portion 37. The first labyrinth portion 61 extends to the support portion 352.

As shown in FIG. 4, the second labyrinth portion 62 extends from the distal end of the first labyrinth portion 61. The second labyrinth portion 62 interposes and holds the rotational shaft portion 41 together with the lateral plate portion 37 of the housing 3 therebetween. In other words, the second labyrinth portion 62 extends along the lateral plate portion 37, while being disposed away therefrom at an interval; additionally, the rotational shaft portion 41 is disposed between the second labyrinth portion 62 and the lateral plate portion 37.

The second labyrinth portion 62 is shorter in dimension from the first labyrinth portion 61 than a portion 38 at which the housing 3 overlaps with the door part 4 (hereinafter referred to as "overlapping portion 38" on an as-needed basis). In other words, when the dimension from the first labyrinth portion 61 is herein set as "length", the length (L1) of the second labyrinth portion 62 is shorter than the length (L2) the overlapping portion 38.

The overlapping portion 38 overlaps not only with the rotational shaft portion 41 but also with part of the door body 42. Specifically, the overlapping portion 38 overlaps with the rotational shaft portion 41-side end of the door body 42. On the other hand, the second labyrinth portion 62 overlaps with the rotational shaft portion 41 without overlapping with the door body 42. According to this configuration, dust and rainwater can be inhibited from intruding into the housing 3; simultaneously, when opened, the door part 4 can be turned as widely as possible.

The rotational shaft portion 41 is accommodated in a space enclosed by the overlapping portion 38, the first labyrinth portion 61, and the second labyrinth portion 62. The rotational shaft portion 41, except for a part thereof connected to the door body 42, is covered from three sides. Thus, the labyrinth structure is formed between the rotational shaft portion 41 and the housing 3; hence, intrusion of dust and rainwater can be more reliably inhibited.

The discharge groove 351, provided on the bottom plate portion 35 of the housing 3, extends from the overlapping portion 38 to the end edge of the bottom plate portion 35. When described in detail, the discharge groove 351 continues to the lower end of the overlapping portion 38. Additionally, the discharge groove 351 extends to one of the end edges of the bottom plate portion 35, i.e., the end edge opposed to the door body 42 of the door part 4. The discharge groove 351 further extends along the end edge of the bottom plate portion 35. Because of this, even when intruding into the housing 3 through the labyrinth structure, rainwater can be discharged to the outside of the housing 3 through the discharge groove 351.

Figure 7:
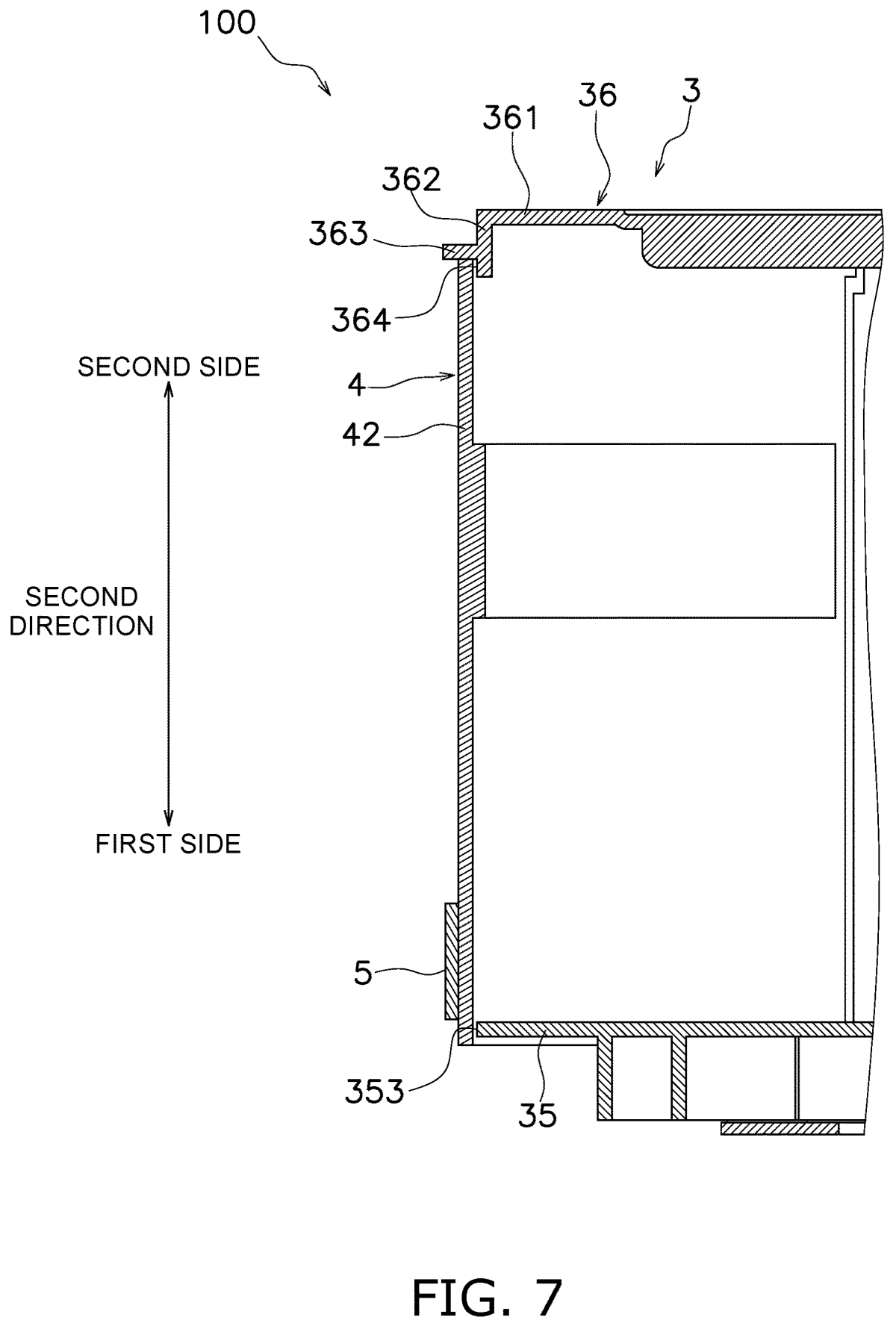

FIG. 7 is a cross-sectional view of the protective case 100 seen from a lateral side. As shown in FIG. 7, the door part 4 is disposed outside the housing 3. The door body 42 of the door part 4 is disposed such that the inner lateral surface is opposed to a lateral surface 353 of the bottom plate portion 35. When described in detail, the inner lateral surface of the lower end of the door body 42 is opposed to the lateral surface 353 of the bottom plate portion 35. It should be noted that the inner lateral surface of the door body 42 refers to a surface facing the interior of the housing 3. The door body 42 extends more downward than the bottom plate portion 35. In other words, the lower end surface of the door body 42 is located further on a lower side than the lower surface of the bottom plate portion 35. The door body 42 produces a gap together with the bottom plate portion 35 therebetween; alternatively, the door body 42 may be in contact with the bottom plate portion 35 so as not to produce any gap therebetween.

The door body 42 is disposed such that the inner lateral surface thereof is opposed to a lateral surface 364 of the top plate portion 36. The upper end surface of the door body 42 is located further on a lower side than the upper surface of the top plate portion 36.

The top plate portion 36 includes a top plate body 361, a circumferential edge wall 362, and a third labyrinth portion 363. The top plate body 361 defines the upper surface of the housing 3. The circumferential edge wall 362 extends toward the bottom plate portion 35 from the outer peripheral edge of the top plate body 361. In other words, the circumferential edge wall 362 extends downward from the outer peripheral edge of the top plate body 361. The door body 42 is disposed such that the inner lateral surface thereof is opposed to the outer lateral surface of the circumferential edge wall 362. It should be noted that the outer lateral surface of the circumferential edge wall 362 corresponds to the lateral surface 364 of the top plate portion 36.

The third labyrinth portion 363 extends from the outer lateral surface of the circumferential edge wall 362. Additionally, the third labyrinth portion 363 extends along the circumferential edge wall 362. The third labyrinth portion 363 is approximately equal in length to the door body 42. The door body 42 is disposed such that the upper end surface thereof is opposed to the third labyrinth portion 363.

[First Protective Member]

As shown in FIG. 2, the first protective member 5 is configured to protect the door part 4. The first protective member 5 extends along a lower part of the door part 4 (see FIG. 8). It should be noted that the first protective member 5 is made of, for instance, steel material, aluminum material, resin material, or so forth.

The first protective member 5 extends in the third direction. The first protective member 5 is disposed on the first side of the housing 3 in the first direction. As seen from above, the first protective member 5 bulges to the first side in the first direction. Specifically, as seen from above, the first protective member 5 extends in a semi-annular shape.

Figure 8:
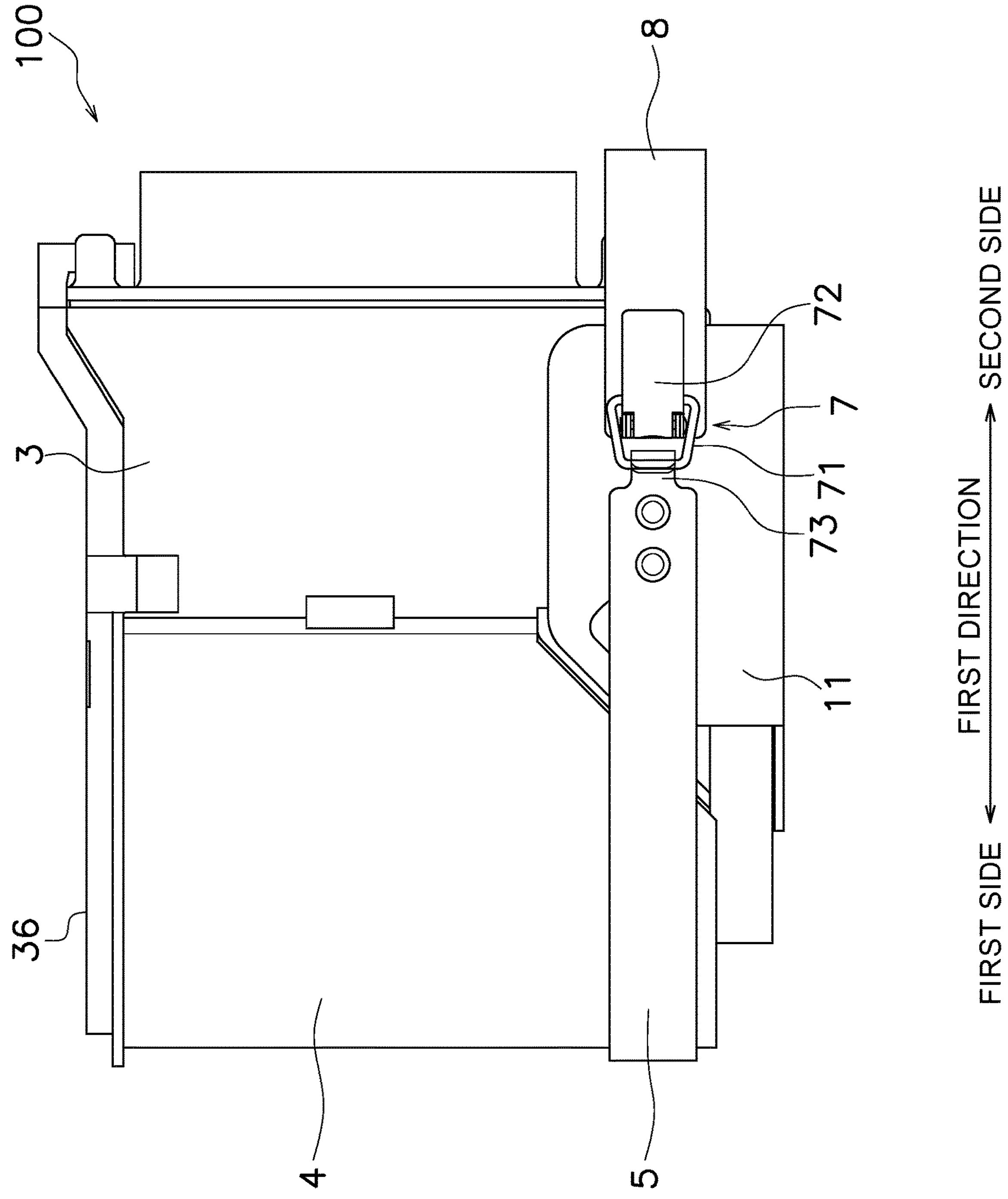
FIG. 8 is a side view of the protective case.
Figure 9:
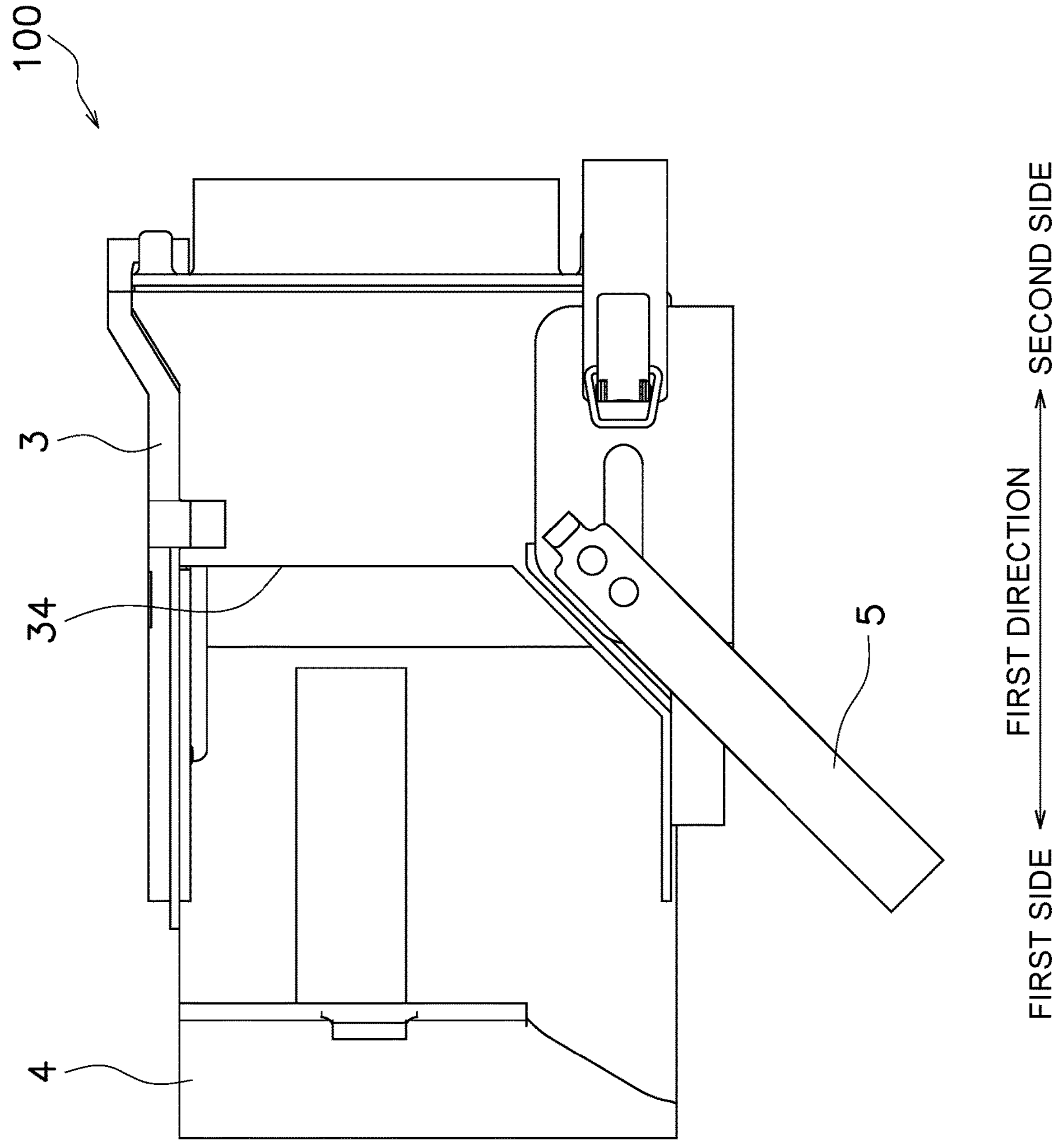
FIG. 9 is a side view of the protective case.

FIGS. 8 and 9 are side views of the protective case 100. It should be noted that FIG. 8 shows the closed state of the door part 4, whereas FIG. 9 shows the opened state of the door part 4. As shown in FIGS. 8 and 9, the first protective member 5 is configured to be switchable between a first posture and a second posture. It should be noted that the first protective member 5 takes the first posture in FIG. 8, whereas the first protective member 5 takes the second posture in FIG. 9.

As shown in FIG. 8, when taking the first posture, the first protective member 5 overlaps with the door part 4 in a first directional view (seen from the left side in FIG. 8). Because of this, when the protective case 100 collides with an obstacle on the road surface during traveling, the door part 4 can be protected by the first protective member 5.

On the other hand, as shown in FIG. 9, when taking the second posture, the first protective member 5 does not overlap with the opening 34 and the door part 4 in a first directional view (seen from the left side in FIG. 9). Additionally, when taking the second posture, the first protective member 5 is disposed not to interfere with the opening or closing motion of the door part 4. Because of this, the opened state of the door part 4 can be made when the first protective member 5 takes the second posture; then, the battery 22 can be easily taken out through the opening 34.

The first protective member 5 is configured to be slidable along the first direction. When described in detail, the first protective member 5 is attached to a guide member 11 attached to the housing 3, while being slidable thereat. When switched from the first posture to the second posture, the first protective member 5 is moved to slide to the first side in the first direction so as to remote from the housing 3 along the first direction. Contrarily, when switched from the second posture to the first posture, the first protective member 5 is moved to slide to the second side in the first direction so as to approach to the housing 3 along the first direction.

As shown in FIG. 8, when taking the first posture, the first protective member 5 restricts the motion of the door part 4 such that the opened state of the door part 4 cannot be made. Speaking in detail, when taking the first posture, the first protective member 5 is adjacent to the door part 4 on the first side of the door part 4 in the first direction. It should be noted that the first protective member 5 may press the door part 4 toward the housing 3. It should be noted that the first protective member 5 includes a buffer member 54 disposed between the first protective member 5 and the door part 4 (see FIG. 2).

[Lock Mechanism]

As shown in FIGS. 2 and 8, the lock mechanism 7 is configured to keep the first protective member 5 in the first posture by restricting the slide motion of the first protective member 5. The lock mechanism 7 is disposed on the second side of the housing 3 in the third direction. The lock mechanism 7 is disposed on the opposite side of the rotational shaft portion 41 of the door part 4. It should be noted that the lock mechanism 7 is not disposed on the first side in the third direction.

In the present embodiment, the lock mechanism 7 is a so-called toggle latch. The lock mechanism 7 includes a latch portion 71, a lever portion 72, and a catch portion 73. It should be noted that the latch portion 71 and the lever portion 72 are attached to the housing 3. When described in detail, the latch portion 71 and the lever portion 72 are attached to the housing 3 through the second protective member 8 and the guide member 11. Because of this, the latch portion 71 and the lever portion 72 are fixed not to be movable to slide in the first direction. The catch portion 73 is provided in the first protective member 5. Because of this, the catch portion 73 is movable to slide in the first direction together with the first protective member 5. It should be noted that the catch portion 73 is integrated with the first protective member 5 as a single member.

The latch portion 71 is hooked on the catch portion 73; then, the lever portion 72 is flipped down to the second side in the first direction. Accordingly, the lock mechanism 7 is actuated, whereby the slide motion of the first protective member 5 is restricted. When the lever portion 72 is flipped up, an engaged state can be released between the latch portion 71 and the catch portion 73. By thus releasing the engaged state between the latch portion 71 and the catch portion 73, the first protective member 5 is enabled to slide to the first side in the first direction so as to be remote from the housing 3.

[Second Protective Member]

The second protective member 8 extends in the third direction. The second protective member 8 is disposed on the second side of the housing 3 in the first direction. As seen from above, the second protective member 8 bulges to the second side in the first direction. Specifically, as seen from above, the second protective member 8 extends in a semi-annular shape. Because of this, the first and second protective members 5 and 8 are disposed to annularly surround the housing 3 in cooperation with each other.

[Modifications]

One embodiment of the present invention has been explained above. However, the present invention is not limited to the above, and a variety of changes can be made without departing from the gist of the present invention. It should be noted that, basically, the modifications described here are applicable simultaneously.

(a) In the embodiment described above, the overlapping portion 38, the first labyrinth portion 61, and the second labyrinth portion 62 compose the labyrinth structure; however, the configuration of the protective case 100 is not limited to this. For example, the protective case 100 may not include the second labyrinth portion 62. Furthermore, the protective case 100 may not include both the first labyrinth portion 61 and the second labyrinth portion 62.

(b) In the embodiment described above, the protective case 100 includes the first and second protective members 5 and 8; alternatively, the protective case 100 may not include the first and second protective members 5 and 8.

REFERENCE SIGNS LIST

3: Housing
34: Opening
35: Bottom plate portion
351: Discharge groove
36: Top plate portion
361: Top plate body
362: Circumferential edge wall
363: Third labyrinth portion
37: Lateral plate portion
38: Overlapping portion
4: Door part
41: Rotational shaft portion
42: Door body
6: Labyrinth structure
61: First labyrinth portion
62: Second labyrinth portion
20: Drive unit
21: Electric motor
22: Battery
100: Protective case

What is claimed is:

1. A protective case comprising:

a housing including an opening and an overlapping portion; and a door part including a rotational shaft portion and a door body, the door part attached to the housing so as to be openable and closable about the rotational shaft portion, the rotational shaft portion disposed outside the housing, the rotational shaft portion being disposed to overlap with the overlapping portion, the door body extending from the rotational shaft portion to overlap with the overlapping portion and cover the opening.

2. A protective case comprising:

a housing including an opening;

a door part including a rotational shaft portion and a door body, the door part attached to the housing so as to be openable and closable about the rotational shaft portion, the rotational shaft portion disposed outside the housing so as to overlap with the housing, the door body extending from the rotational shaft portion so as to cover the opening; and a first labyrinth portion extending from an outer lateral surface of the housing on an opposite side of the door body with reference to the rotational shaft portion.

3. The protective case according to claim 2, further comprising:

a second labyrinth portion extending from the first labyrinth portion so as to interpose and hold the rotational shaft portion together with the housing therebetween.

4. The protective case according to claim 3, wherein the second labyrinth portion is shorter in dimension from the first labyrinth portion than a portion at which the housing overlaps with the door part.

5. The protective case according to claim 1, wherein the housing includes a bottom plate portion supporting the rotational shaft portion, and the bottom plate portion includes a discharge channel extending to an end edge of the bottom plate portion from a portion at which the housing overlaps with the door part.

6. A protective case comprising:

a housing including an opening; and a door part including a rotational shaft portion and a door body, the door part attached to the housing so as to be openable and closable about the rotational shaft portion, the rotational shaft portion disposed outside the housing so as to overlap with the housing, the door body extending from the rotational shaft portion so as to cover the opening, the housing includes a bottom plate portion, a top plate portion, and a lateral plate portion, the top plate portion disposed above the bottom plate portion, the lateral plate portion extending from the bottom plate portion to the top plate portion, the lateral plate portion including the opening, and the door body is disposed such that an inner lateral surface thereof is opposed to at least one of a lateral surface of the top plate portion and a lateral surface of the bottom plate portion.

7. The protective case according to claim 6, wherein the top plate portion includes a top plate body and a circumferential edge wall, the circumferential edge wall extending from an outer peripheral edge of the top plate body toward the bottom plate portion, and the door body is disposed such that the inner lateral surface thereof is opposed to an outer lateral surface of the circumferential edge wall.

8. The protective case according to claim 7, wherein the top plate portion includes a third labyrinth portion extending from an outer lateral surface of the circumferential edge wall, and the door body is disposed such that a top end surface thereof is opposed to the third labyrinth portion.

9. The protective case according to claim 6, wherein the rotational shaft portion includes a first end and a second end, the first end inserted into a through hole provided in the bottom plate portion, the second end inserted into a recess provided on the top plate portion.

10. A drive unit comprising:

the protective case recited in claim 1;

a battery disposed inside the housing; and an electric motor configured to be driven by electric power supplied thereto from the battery.

* * * * *